United States Patent
Ju et al.

(10) Patent No.: US 9,350,186 B2
(45) Date of Patent: May 24, 2016

(54) BATTERY PACK

(71) Applicant: Samsung SDI Co. Ltd., Yongin-si, Gyeonggi-do (KR)

(72) Inventors: Ri-A Ju, Yongin-si (KR); Hyun Kim, Yongin-si (KR); Ji-Hong Lim, Yongin-si (KR); Suk-Kyum Kim, Yongin-si (KR); Seong-Joon Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 517 days.

(21) Appl. No.: 13/748,548

(22) Filed: Jan. 23, 2013

(65) Prior Publication Data

US 2013/0249496 A1    Sep. 26, 2013

(30) Foreign Application Priority Data

Mar. 23, 2012 (KR) .................. 10-2012-0030238

(51) Int. Cl.
| | |
|---|---|
| *H02J 7/00* | (2006.01) |
| *F02N 11/08* | (2006.01) |
| *F02N 11/10* | (2006.01) |
| *H01M 2/10* | (2006.01) |
| *H02J 1/06* | (2006.01) |
| *H01M 10/42* | (2006.01) |

(52) U.S. Cl.
CPC ............ *H02J 7/0063* (2013.01); *F02N 11/0825* (2013.01); *F02N 11/101* (2013.01); *H01M 2/1077* (2013.01); *H02J 7/0075* (2013.01); *F02N 11/0862* (2013.01); *F02N 2200/06* (2013.01); *F02N 2200/064* (2013.01); *H01M 2010/4271* (2013.01); *H01M 2200/00* (2013.01); *H01M 2220/20* (2013.01); *H02J 1/06* (2013.01); *H02J 7/009* (2013.01); *H02J 7/0029* (2013.01); *H02J 2007/004* (2013.01); *H02J 2007/0037* (2013.01); *Y02T 10/48* (2013.01)

(58) Field of Classification Search
USPC .................. 320/112, 120, 136, 105, 106, 137
See application file for complete search history.

(56) References Cited

U.S. PATENT DOCUMENTS

| | | | |
|---|---|---|---|
| 6,570,385 B1 * | 5/2003 | Roberts et al. ................ 324/378 |
| 7,039,534 B1 * | 5/2006 | Ryno et al. ...................... 702/63 |
| 7,053,588 B2 * | 5/2006 | Nakanishi ........... B60L 11/1851 320/104 |
| 2004/0095109 A1 | 5/2004 | Kernahan | |
| 2007/0138998 A1 * | 6/2007 | Togashi et al. ................ 320/104 |
| 2009/0220825 A1 | 9/2009 | Nakashima et al. | |

(Continued)

FOREIGN PATENT DOCUMENTS

| | | |
|---|---|---|
| JP | 2000-308277 | 11/2000 |
| KR | 10-2005-0061606 | 6/2005 |

(Continued)

OTHER PUBLICATIONS

KIPO Notice of Allowance dated Nov. 25, 2013, for Korean priority Patent application 10-012-0030238, (6 pages).

(Continued)

*Primary Examiner* — Brian Ngo
(74) *Attorney, Agent, or Firm* — Lewis Roca Rothgerber Christie LLP

(57) ABSTRACT

A battery pack includes a battery for supplying power to a starter motor of a vehicle, and a battery management unit for monitoring a condition of the battery, and for blocking the supply of power from the battery to the starter motor when a stability condition requirement for the battery is not satisfied.

19 Claims, 5 Drawing Sheets

(56) References Cited

U.S. PATENT DOCUMENTS

| | | | | |
|---|---|---|---|---|
| 2010/0242905 A1* | 9/2010 | Machida | ............ | F02N 11/0844 |
| | | | | 123/339.14 |
| 2011/0169448 A1* | 7/2011 | Ichikawa | ............... | B60K 6/445 |
| | | | | 320/109 |
| 2012/0200262 A1* | 8/2012 | Gibson et al. | ................. | 320/128 |
| 2013/0154544 A1* | 6/2013 | Yokoyama et al. | ........... | 320/105 |
| 2013/0249488 A1* | 9/2013 | Ju et al. | ........................ | 320/112 |

FOREIGN PATENT DOCUMENTS

| | | |
|---|---|---|
| KR | 10-2005-0098678 A | 10/2005 |
| KR | 10-2006-0067361 A | 6/2006 |
| KR | 10-2008-0103397 A | 11/2008 |
| KR | 10-2009-0107359 | 10/2009 |
| KR | 10-2011-0052151 A | 5/2011 |
| KR | 10-2011-0064380 A | 6/2011 |
| KR | 10-2012-0003584 A | 1/2012 |

OTHER PUBLICATIONS

Patent Abstracts of Japan, and English machine translation of Japanese Publication 2000-308277 dated Nov. 2, 2000, listed above, (27 pages).

KIPO Office action dated Apr. 30, 2013 in priority Application No. 10-2012-0030238 (4 pages).

SIPO Office action dated Mar. 28, 2016, with English translation, for corresponding Chinese Patent application 201310055236.0, (20 pages).

\* cited by examiner

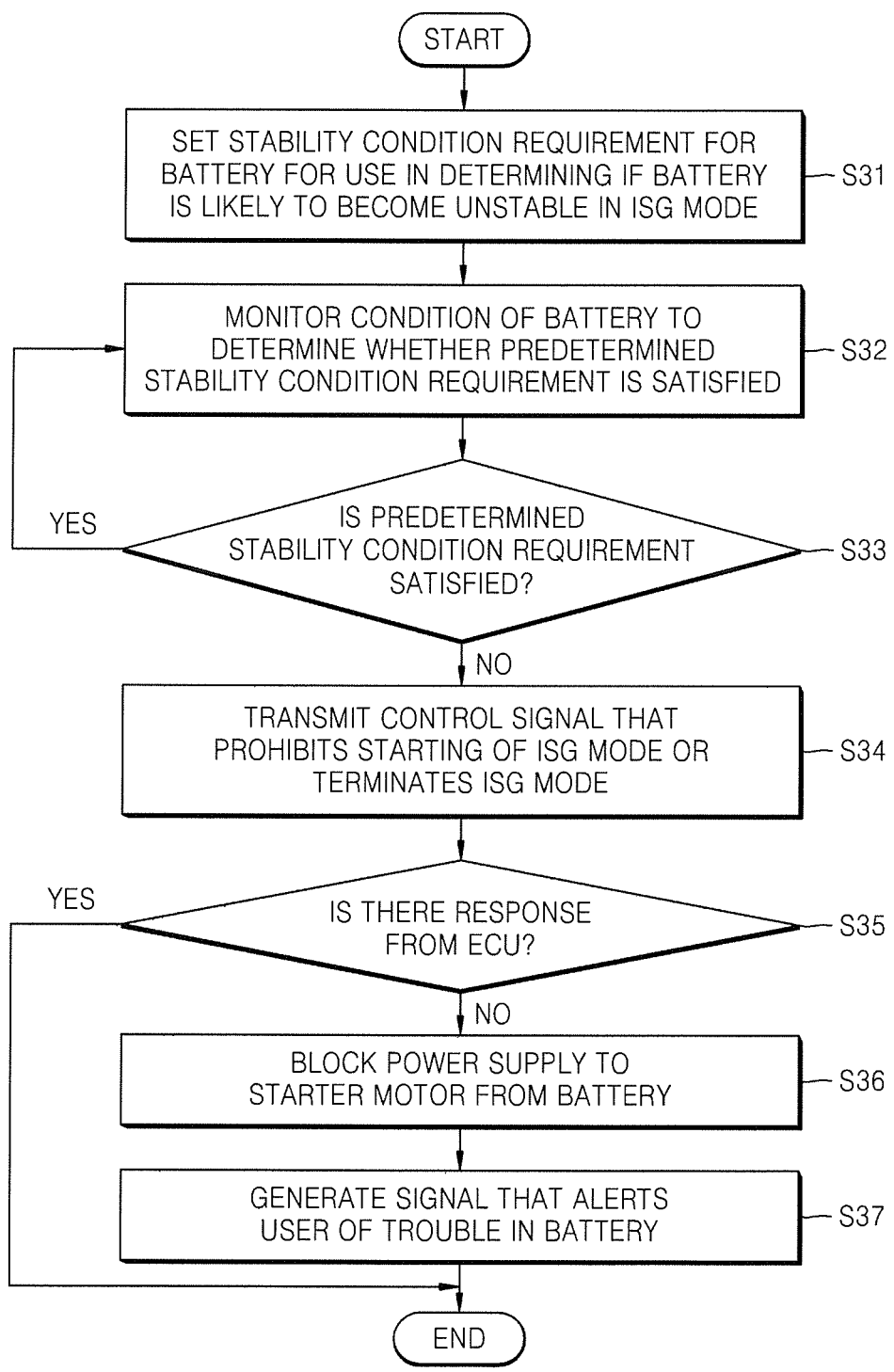

BATTERY PACK

CROSS-REFERENCE TO RELATED APPLICATION

This application claims priority to and the benefit of Korean Patent Application No. 10-2012-0030238, filed on Mar. 23, 2012, in the Korean Intellectual Property Office, the disclosure of which is incorporated herein by reference.

BACKGROUND

1. Field

One or more embodiments of the present invention relate to a battery pack.

2. Description of the Related Art

Unlike primary batteries, which are not designed to be recharged, secondary batteries are chargeable and dischargeable. Secondary batteries may be used as an individual battery or as a battery module including a plurality of batteries coupled together to form a unit according to a type of an external device used with the secondary battery.

Lead storage batteries are commonly used as a power supply device for engine start-up. Recently, use of an ISG (Idle Stop & Go) system is becoming increasingly popular for improved fuel efficiency. A power supply device with the ISG system as an idling-limiting device should have high-output characteristics for engine start-up, should have strong charge and discharge characteristics, should be durable against frequent start-up operations, and should have a long lifespan. However, a vehicle equipped with such an ISG system needs a device that ensures battery stability.

SUMMARY

One or more embodiments of the present invention include a battery pack in which, via monitoring of a battery, a control signal that prohibits start-up of an ISG (Idle Stop & Go) mode or terminates the ISG mode is generated when a predetermined stability condition requirement for the battery is not satisfied.

One or more embodiments of the present invention include a battery pack in which, via monitoring of a battery, power from the battery to a starter motor of a vehicle is blocked when a predetermined stability condition requirement for the battery is not satisfied.

Additional aspects will be set forth in part in the description which follows and, in part, will be apparent from the description, or may be learned by practice of the presented embodiments.

According to one or more embodiments of the present invention, a battery pack includes a battery for supplying power to a starter motor of a vehicle, and a battery management unit for monitoring a condition of the battery, and for blocking the supply of power from the battery to the starter motor when a stability condition requirement for the battery is not satisfied.

The battery may be coupled to a vehicle supporting an Idle Stop & Go (ISG) mode, and the battery management unit may be configured to generate a control signal when the stability condition requirement is not satisfied for preventing starting of the ISG mode or for terminating the ISG mode.

The battery pack may further include a recovery process unit for restoring the battery to normal operating conditions when the stability condition requirement is not satisfied.

The stability requirement may correspond to at least one of a battery temperature, a cooling water temperature, a vehicle speed, a degree of battery swelling, a presence or an absence of gas in the battery, a battery over-charge, a battery over-discharge, or an internal short of battery.

The battery management unit may be configured to generate a control signal for alerting a user of the vehicle.

According to one or more embodiments of the present invention, a battery pack control method includes monitoring a condition of a battery, and blocking power supplied from the battery to a starter motor of a vehicle when a stability condition requirement for the battery is not satisfied.

The battery may be coupled to a vehicle supporting an Idle Stop & Go (ISG) mode, and a control signal may be generated when the stability condition requirement for the battery is not satisfied for preventing start of the ISG mode or for terminating the ISG mode.

The stability requirement may correspond to at least one of a battery temperature, a cooling water temperature, a vehicle speed, a degree of battery swelling, a presence or an absence of gas in the battery, a battery over-charge, a battery over-discharge, or an internal short of battery.

The battery pack control method may further include generating a control signal to alert a user of the vehicle when the stability control requirement is not satisfied.

According to one or more embodiments of the present invention, a battery pack includes a battery for supplying power to a starter motor of a vehicle, an engine management unit for controlling starting of an Idle Stop & Go (ISG) mode of the vehicle, and a battery management unit for monitoring a condition of the battery and for communicating with the engine management unit, and for transmitting a control signal to the engine management unit when there is no response from the engine management unit, the control signal being for preventing starting of the ISG mode or for terminating the ISG mode, and for blocking the supply of power from the battery to the starter motor of the vehicle.

The stability requirement may correspond to at least one of a battery temperature, a cooling water temperature, a degree of battery swelling, a presence or an absence of gas in the battery, a battery over-charge, a battery over-discharge, or an internal short of battery.

The battery pack may further include a recovery process unit for restoring the battery to normal operating conditions when the stability condition requirement is not satisfied.

The battery management unit may be configured to generate a control signal for alerting a user of the vehicle.

According to one or more embodiments of the present invention, a battery pack control method includes monitoring a condition of a battery, generating a control signal when a stability condition requirement for the battery is not satisfied to prevent starting of an Idle Stop & Go (ISG) or to terminate the ISG mode, transmitting the control signal to an engine management unit, and blocking supply of power from the battery to a starter motor of a vehicle when the engine management unit does not respond within a period of time.

The stability requirement may correspond to at least one of a battery temperature, a cooling water temperature, a vehicle speed, a degree of battery swelling, a presence or absence of gas in the battery, a battery over-charge, a battery over-discharge, or an internal short of battery.

The battery pack control method may further include restoring the battery to normal operating conditions when the stability condition requirement is not satisfied.

The battery pack control method may further include generating a control signal to alert a user of the vehicle when the stability control requirement is not satisfied.

According to one or more embodiments of the present invention, a battery pack includes a battery for supplying power to a starter motor of a vehicle, and a battery management unit for monitoring a condition of the battery, and for generating a control signal when the stability condition requirement for the battery is not satisfied for preventing starting of the ISG mode or for terminating the ISG mode.

According to one or more embodiments of the present invention, a battery pack control method includes monitoring a condition of a battery, and generating a control signal when the stability condition requirement for the battery is not satisfied to prevent starting of an Idle Stop & Go (ISG) or to terminate the ISG mode.

BRIEF DESCRIPTION OF THE DRAWINGS

These and/or other aspects will become apparent and more readily appreciated from the following description of the embodiments, taken in conjunction with the accompanying drawings of which:

FIG. 6 is a flowchart of an operation of a battery pack, according to another embodiment of the present invention.

DETAILED DESCRIPTION

Figure 1:
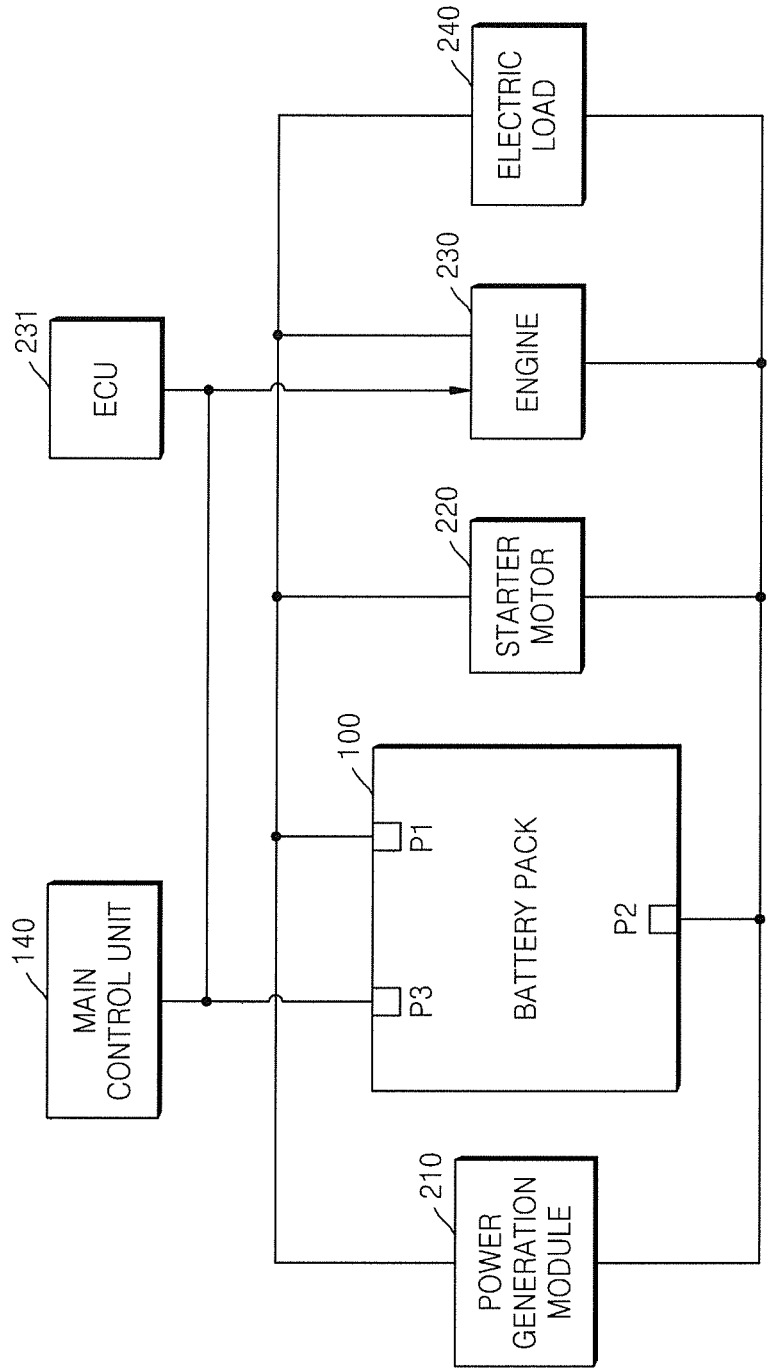
FIG. 1 is a block diagram depicting a structure of a vehicle including a battery pack according to an embodiment of the present invention.

Embodiments of the present invention will now be described more fully with reference to the accompanying drawings, in which exemplary embodiments of the invention are shown. The invention may, however, be embodied in many different forms, and should not be construed as being limited to the embodiments set forth herein; rather, these embodiments are provided so that this disclosure will be thorough and complete, and will fully convey the concept of the embodiments of the present invention to those of ordinary skill in the art. The exemplary embodiments should be considered in a descriptive sense only and not for purposes of limitation. Therefore, the scope of the invention is defined not by the detailed description of the invention but by the appended claims and their equivalents, and all differences within the scope will be construed as being included in the present invention. For example, a particular shape, structure, and feature described in an embodiment of the specification may be applied to another embodiment without departing from the spirit and scope of the present invention. Furthermore, locations or arrangements of individual elements in the embodiments may be varied without departing from the spirit and scope of the present invention. Like reference numerals in the drawings denote like elements, and thus their description will not be repeated.

Hereinafter, embodiments of the present invention will now be described more fully with reference to the accompanying drawings, so that this disclosure will be thorough and complete, and will fully convey the concept of the embodiments of the invention to those of ordinary skill in the art.

FIG. 1 is a block diagram illustrating a structure of a vehicle including a battery pack 100 according to an embodiment of the present invention.

The battery pack 100 may be electrically coupled in parallel with a power generation module 210 and a starter motor 220 via first and second terminals P1 and P2.

In particular, the battery pack 100 may store charging power generated from the power generation module 210, and may supply discharging power to the starter motor 220. For example, the power generation module 210 may be coupled to an engine (not shown) for power transmission and/or conversion purposes. For example, the power generation module 210 may be coupled to a driving shaft of the engine to convert rotary power to electric output. Charging power is generated from the power generation module 210 during the conversion, and may be stored in a battery module 110 (see FIGS. 2 and 3), which will be described later, via the first and second terminals P1 and P2 of the battery pack 100. For example, the power generation module 210 may include a direct current (DC) power generator (not shown), or an alternating current (AC) power generator (not shown) and a rectifier (not shown). The power generation module 210 may generate a DC voltage of about 15 V, and in some embodiments, a DC voltage of about 14.6 V to about 14.8 V.

For example, the battery pack 100 may be used as a power device for engine start-up in an ISG system for gas mileage improvement. In the ISG system, with frequent repeating of engine stopping and starting, the battery pack 100 is repeatedly charged and discharged.

An existing lead storage battery used in an ISG system has reduced durability due to frequent charging and discharging, and thus has deteriorated charging and discharging characteristics. In particular, with repeated charging and discharging, charge capacity is reduced, and start-up characteristics of the engine may be deteriorated, so that an exchange cycle of the lead storage battery may be shortened.

However, according to the present embodiment of the present invention, the battery pack 100 has relatively stable charge and discharge characteristics compared to lead storage batteries, and includes a lithium ion battery that is less likely to deteriorate with time, and thus, the battery pack 100 may be suitable in an ISG system in which the engine is repeatedly stopped and started. Furthermore, as compared with lead storage batteries having the same charging capacity, the battery pack 100 may have a smaller weight and a smaller volume, and thus may result in improved fuel efficiency, and may use a reduced loading space. The battery module 110 of the present embodiment is not limited to lithium ion batteries, and may use a nickel metal hydride battery (NiMH), or any other suitable rechargeable batteries known to those skilled in the art.

In an embodiment of the present invention, the battery pack 100 may generate a signal that blocks power supply to the engine from the battery, or a signal that prohibits starting of the ISG mode, or terminates the ISG mode, when a requirement (e.g., a predetermined stability condition requirement) for the battery is not satisfied. A detailed internal structure and operation of the battery pack 100 will be described later with reference to FIG. 2.

A main control unit 140 may control the entire operation of the vehicle equipped with the battery pack 100. The main control unit 140 may exchange a control signal with the battery pack 100 coupled thereto via a third terminal P3, and may monitor the condition of the battery pack 100 to control the operation of the battery pack 100.

The power generation module 210 may include an alternator of the vehicle. The alternator may supply charging power to the battery pack 100, and may supply power to an electric load 240, which will be described later, during operation of the engine 230.

The starter motor 220 is operated to start up the vehicle, and may provide initial rotary power for turning a driving shaft of the engine 230. For example, the starter motor 220 may be supplied with the electric power stored in the battery pack 100 via the first and second terminals P1 and P2, and may use the electric power to rotate the driving shaft of the engine 230 to start up the engine 230 or to restart the engine 230 after an idle stop.

In particular, the starter motor 220 provides an initial rotary force of the engine 230 when a user starts up or makes a vehicle idle go after idle stops. The term "idle go" refers to the moment at which the engine starts again after an idle stop. The term "idle stop" refers to when the engine stops when the vehicle stops. According to the present embodiment, during operation of the engine 230 by the starter motor 220, the power generation module 210 may be operated to generate the charging power.

The engine 230, which is an internal-combustion engine for providing a driving force to the vehicle, may be provided with an initial rotary power from the starter motor 220, as described above. The engine 230 may be controllable by an engine control unit (ECU) 231.

The ECU 231, which is for controlling the operation of the engine 230, may determine whether the vehicle can operate in an ISG mode, and whether to make the vehicle idle stop or idle go in the ISG mode. In particular, when a user of an ISG mode-supporting vehicle selects the ISG mode, the ECU 231 may determine whether the vehicle can be operated in the ISG mode. In the ISG mode, the ECU 231 may stop the vehicle if a period of time (e.g., predetermined period of time) passes from stopping of the vehicle, and may perform an engine restart to restart the vehicle.

In some embodiments of the present invention, if the ECU 231 fails to perform these operations due to an error, the ECU 231 may be requested to terminate the ISG mode, or to prohibit starting of the ISG mode, according to the condition of the battery pack 100. If there is no response from the ECU 231, the ECU 231 may block power supply to the starter motor 220 from the battery pack 100, thereby limiting start-up of the engine 230.

The electric load 240 may be coupled to the battery pack 100 along with the power generation module 210 and the starter mortar 220. The electric load 240, which consumes the power stored in the battery pack 100, may be supplied with the stored discharge power through the first and second terminals P1 and P2. The electric load 240 may include a variety of electric devices.

Figure 2:
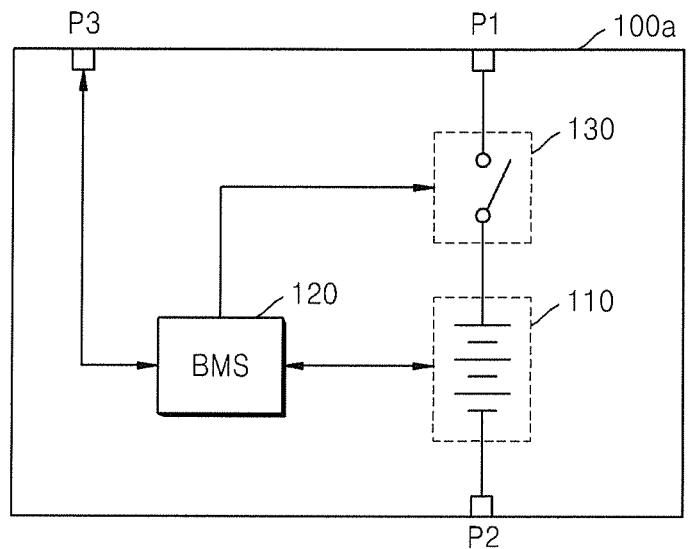
FIG. 2 is a block diagram of a battery pack according to another embodiment of the present invention.

FIG. 2 is a block diagram of a battery pack 100a according to another embodiment of the present invention.

Referring to FIG. 2, the battery pack 100a may include a battery module 110, a battery management system (BMS) 120, and a cutoff unit 130. The battery module 110 may include a plurality of battery cells (not shown) coupled in series or in parallel. In the present embodiment the battery module 110 coupled between the first and second terminals P1 and P2 may be supplied with charging power and may output discharging power.

The battery module 110 may refer to any structure including a plurality of battery subunits. For example, the battery pack 100 may be a battery rack including a plurality of battery trays, or the battery module 100 may be a battery tray including a plurality of battery cells. As described above, the battery module 100 may be implemented as a lithium ion battery, a nickel-metal hydride battery, or the like.

The BMS 120 may monitor the condition of the battery and may control charge and discharge operations. The BMS 120 may have, for example, functions to protect against over-charging, over-discharging, over-current, over-voltage, and over-heating, and may also have a cell balancing function. To this end, the BMS 120 may include a measuring unit for measuring voltage, current, temperature, remaining power amount, lifetime, state of charge (SOC), or the like, of the battery module 110.

In the present embodiment, the BMS 120 may determine whether operating the vehicle in the ISG mode would be safe, and may generate a control signal that prohibits starting the ISG mode or that terminates the ISG mode if starting the vehicle is determined to be unstable. After transmission of the control signal to the ECU 231, if the ECU 231 does not prohibit starting of the ISG mode or terminate the ISG mode within a predetermined period of time, the BMS 120 may immediately block power supply to the starter motor 220. That is, according to the present invention, the BMS 120 may prevent the battery module 110 from recurrently restarting the engine in a situation where the stability of the battery module 110 is doubtful.

The BMS 120 may previously determine a stability condition requirement for the battery. The condition (e.g., the predetermined stability condition requirement) for the battery correspond to battery temperature, cooling water temperature, degree of battery swelling, detection of gas presence in/absence from the battery, battery over-charge, battery over-discharge, and internal shorting of the battery.

As described above, a vehicle using the ISG mode that recurrently starts or restarts the engine needs a more stable power supply from the battery to the starter motor 220 compared to commonly used general vehicles. For example, in a general vehicle, electric power is supplied from the battery to the starter motor only when a user starts the vehicle. Accordingly even with a temperature rise in the battery, the temperature of the battery may be lowered until the vehicle is next started. However, in a vehicle using the ISG mode, due to recurrent idle-stop and idle-go during traveling, a cycle of power supply from the battery to the starter motor is too short to allow the battery to recover from a malfunction.

Accordingly, if the battery has a stability problem, for example, due to an excessively high temperature or severe swelling exceeding a reference level, continuous driving in the ISG mode may cause a risk of an accident occurring. In the present embodiment, generally, the ECU 231 is responsible for starting or terminating the ISG mode, while the BMS 120 in the battery pack 100 may directly block power supply from the battery pack 100 to the starter motor 220 by sensing a malfunction in the battery module 110 and by generating the control signal that prohibits starting of the ISG mode.

According to an embodiment of the present invention, the BMS 120 may generate a control signal that prohibits starting of the ISG mode, or that terminates the ISG mode, if the battery module 110 does not satisfy the condition (e.g., the predetermined stability condition requirement) for the battery. After transmission of the control signal to the ECU 231, if there is no response from the ECU 231 within a period of time (e.g., a predetermined time), the BMS 120 may directly block the supply of power to the starter motor 220 to protect the battery module 110. The BMS 120 may also generate a signal that alerts the user of a malfunction in the battery module 110.

In another embodiment, if the condition (e.g., the predetermined stability condition requirement) for the battery is not satisfied, the BMS 120 may directly block the power supply to the starter motor 220 without communication with the ECU 231. In this regard, the BMS 120 may generate a signal that alerts a user of a malfunction in the battery module 110.

When the BMS 120 directly determines the condition of the battery module 110 to block power supply, as described above, it is not possible for the ECU 231 to restart the engine even when the ISG mode starts or is maintained. This ensures stability of the battery module 110. However, it may be desirable to alert a user of the vehicle of a malfunction in the battery.

The cutoff unit 130 may include a switch, and may receive the control signal from the BMS 120 to block the power supply from the battery module 110 to the starter motor 220. That is, if the condition (e.g., the predetermined stability condition requirement) for the battery is satisfied, the cutoff unit 130 may couple the battery module 110 and the first terminal P1. If a cutoff signal is received from the BMS 120, the cutoff unit 110 may switch off to open, or disconnect, the first terminals P1 and the battery module 110. Although in the embodiment of FIG. 2 the cutoff unit 130 is implemented as a switch, the cutoff unit 130 may be any of a variety of devices capable of functioning like a switch, such as a transistor.

Figure 3:
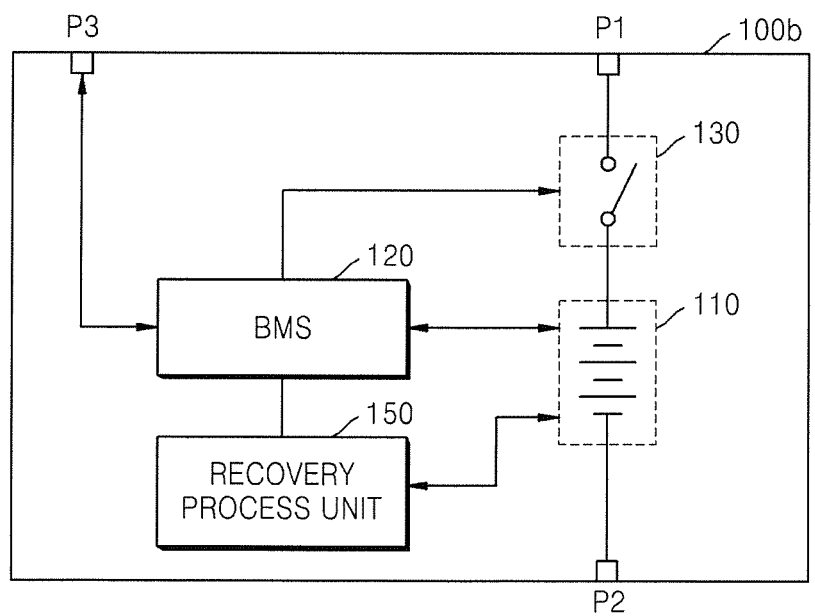
FIG. 3 is a block diagram of a battery pack according to another embodiment of the present invention.

FIG. 3 is a block diagram of a battery pack 100b according to another embodiment of the present invention.

Referring to FIG. 3, the battery pack 100b may further include a recovery process unit 150 unlike the battery pack 100a of FIG. 2. The recovery process unit 150 may restore the battery to normal operating conditions until the battery module 110 returns to a normal condition.

In the present embodiment, if the condition (e.g., the predetermined stability condition requirement) for the battery is not satisfied, the BMS 120 may provide this information to the recovery process unit 150. After the recovery process unit 150 completes the recovery process on the battery module 110, the BMS 120 may monitor if the battery module 110 satisfies the condition (e.g., the predetermined stability condition requirement), and may generate a control signal that prohibits starting of the ISG mode, or that terminates the ISG mode if the condition (e.g., the predetermined stability condition requirement) is still not satisfied, to block the power supply to the starter motor 220.

Figure 4:
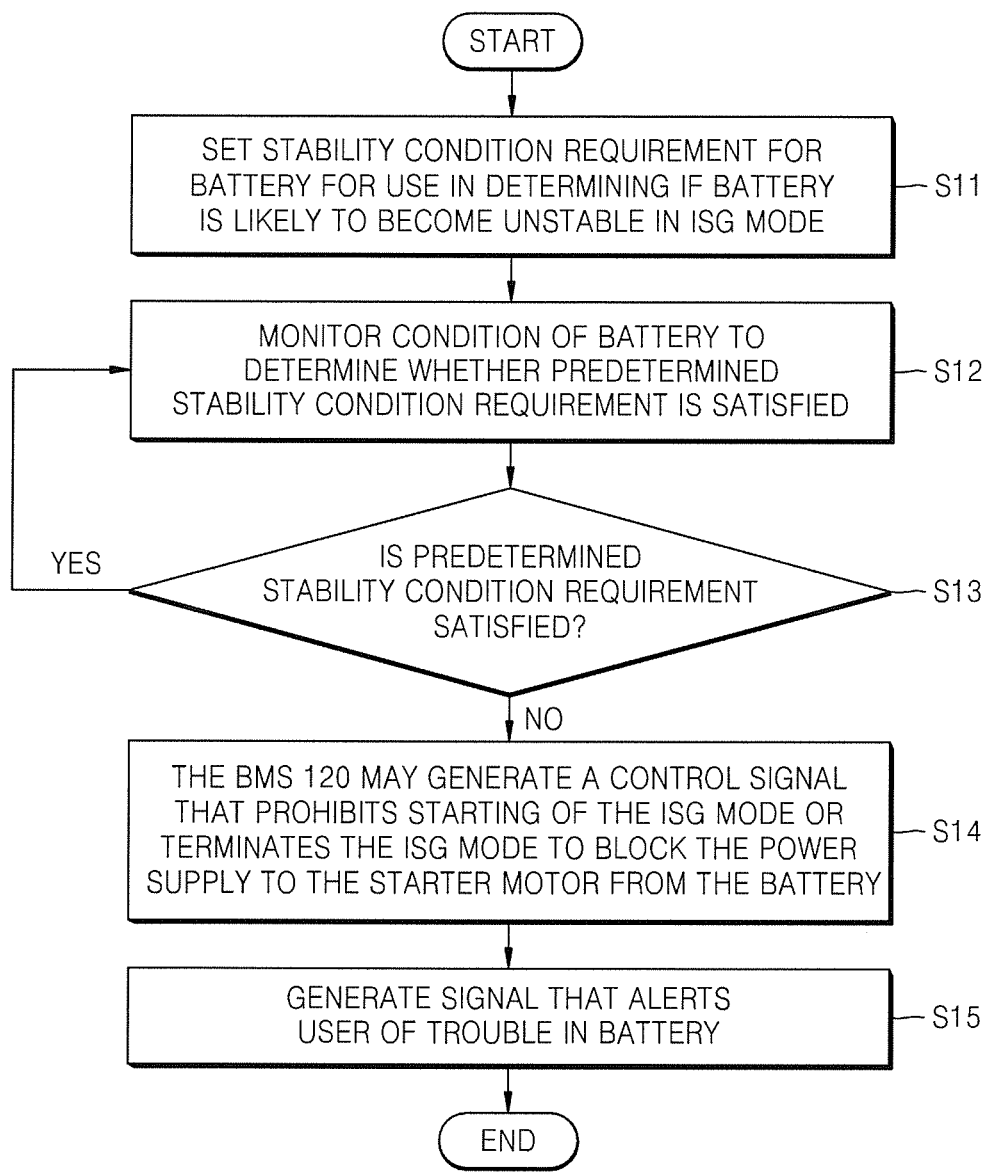
FIG. 4 is a flowchart of an operation of a battery pack, according to an embodiment of the present invention.

FIG. 4 is a flowchart of an operation of a battery pack, according to an embodiment of the present invention.

Referring to FIG. 4, a condition (e.g., a stability condition requirement) for a battery for use in determining if the battery is likely to become unstable in the ISG mode may be set with reference to a user's setting or to an initial set value based on characteristics of the battery (Operation S11).

Next, the BMS 120 may monitor the condition of the battery to determine whether the condition (e.g., the predetermined stability condition requirement) is satisfied (Operation S12).

If the condition (e.g., the predetermined stability condition requirement) is satisfied (S13), the BMS 120 may continue monitoring the condition of the battery.

If the condition (e.g., the predetermined stability condition requirement) is not satisfied (S13), the BMS 120 may generate a control signal that prohibits starting of the ISG mode or that terminates the ISG mode, to block the power supply to the starter motor from the battery (S14).

Finally, the BMS 120 may generate a signal that alerts a user of a malfunction/trouble in the battery (Operation S15).

Figure 5:
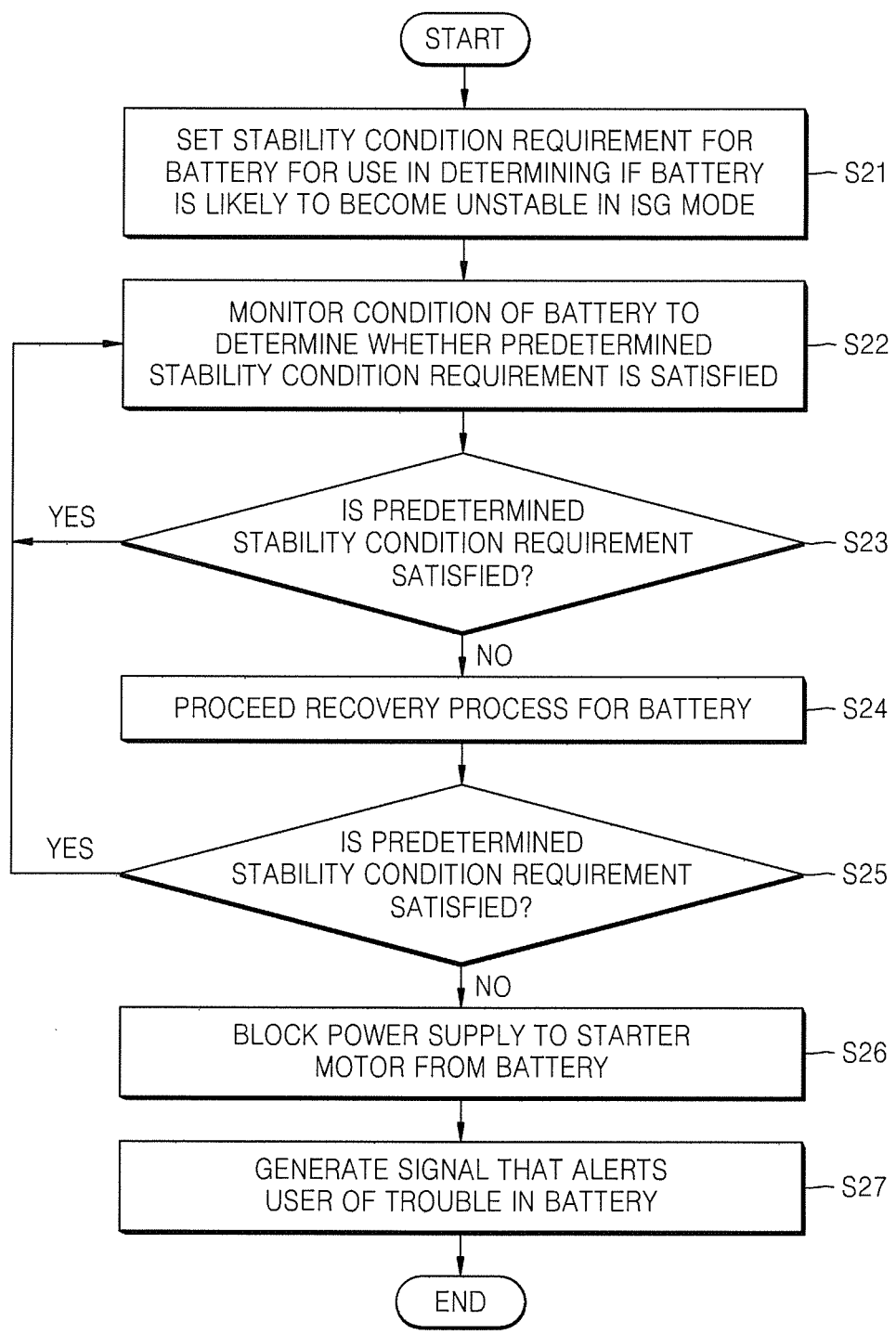
FIG. 5 is a flowchart of an operation of a battery pack, according to another embodiment of the present invention.

FIG. 5 is a flowchart of an operation of a battery pack, according to another embodiment of the present invention.

Referring to FIG. 5, a condition (e.g., a stability condition requirement) for a battery for use in determining if the battery is likely to become unstable in the ISG mode may be set with reference to a user's setting or an initial set value based on characteristics of the battery (Operation S21).

Next, the BMS 120 may monitor the condition of the battery to determine whether the condition (e.g., the predetermined stability condition requirement) is satisfied (Operation S22).

If the condition (e.g., the predetermined stability condition requirement) is satisfied (S23), the BMS 120 may continue monitoring the condition of the battery.

If the condition (e.g., the predetermined stability condition requirement) is not satisfied (Operation S23), the recovery process unit 150 may proceed with a recovery process for the battery (Operation S24).

If the condition (e.g., the predetermined stability condition requirement) is still not satisfied after the recovery process (Operation S25), the BMS 120 may block power supply to the starter motor 220 from the battery (Operation S26).

Finally, the BMS 120 may generate a signal that alerts a user of a malfunction in the battery (Operation S27).

FIG. 6 is a flowchart of an operation of a battery pack, according to another embodiment of the present invention.

Operations S31 to S33 in the present embodiment are the same as operations S21 to S23 in the previous embodiment described with reference to FIG. 5.

Next, if the condition (e.g., the predetermined stability condition requirement) is not satisfied (Operation S33), the BMS 120 may transmit a control signal that prohibits starting of the ISG mode or that terminates the ISG mode to the ECU 231 (Operation S34).

If a response from the ECU 231 is received, the BMS 120 stops the operation which is related to power supply controlled by the BMS 120. If there is no response from the ECU 231 within a predetermined period of time, the BMS 120 may block the power supply to the starter motor from the battery (Operation S36).

Finally, the BMS 120 may generate a signal that alerts a user of a malfunction/trouble in the battery (Operation S37).

As described above, according to the one or more of the above embodiments of the present invention, if a condition (e.g., a predetermined stability condition requirement) for a battery is not to be satisfied as determined through monitoring the battery, a control signal that prohibits starting of the ISG mode or that terminates the ISG mode may be generated.

If a condition (e.g., a predetermined stability condition requirement) for a battery is determined not to be satisfied through monitoring the battery, power supply to a starter motor from the battery may be blocked.

While this invention has been particularly shown and described with reference to exemplary embodiments thereof, it will be understood by those of ordinary skill in the art that various changes in form and details may be made therein without departing from the spirit and scope of the invention as defined by the appended claims, and their equivalents. The embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A battery pack comprising:
   a battery for supplying power to a starter motor of a vehicle;
   an engine management unit for controlling an engine of the vehicle; and
   a battery management unit for monitoring a condition of the battery, wherein the battery management unit is configured to generate a control signal when a stability condition requirement for the battery is not satisfied and to detect a response of the engine management unit to the control signal, and to block the supply of power from the battery to the starter motor when no response from the engine management unit is detected after a period of time.

2. The battery pack of claim 1, wherein the battery is coupled to a vehicle supporting an Idle Stop & Go (ISG) mode, and
wherein the control signal is for preventing starting of the ISG mode or for terminating the ISG mode.

3. The battery pack of claim 1, further comprising a recovery process unit for restoring the battery to normal operating conditions when the stability condition requirement is not satisfied.

4. The battery pack of claim 1, wherein the stability requirement corresponds to at least one of a battery temperature, a cooling water temperature, a vehicle speed, a degree of battery swelling, a presence or an absence of gas in the battery, a battery over-charge, a battery over-discharge, or an internal short of battery.

5. The battery pack of claim 1, wherein the battery management unit is further configured to generate a control signal for alerting a user of the vehicle.

6. A battery pack control method comprising:
monitoring a condition of a battery by a battery management unit;
generating a control signal when a stability condition requirement for the battery is not satisfied;
transmitting the control signal to an engine management unit;
detecting a response of the engine management unit to the control signal; and
blocking power supplied from the battery to a starter motor of a vehicle when no response of the engine management unit is detected after a period of time.

7. The battery pack control method of claim 6, wherein
the battery is coupled to a vehicle supporting an Idle Stop & Go (ISG) mode, and
the control signal is generated when the stability condition requirement for the battery is not satisfied for preventing start of the ISG mode or for terminating the ISG mode.

8. The battery pack control method of claim 6, wherein
the stability requirement corresponds to at least one of a battery temperature, a cooling water temperature, a vehicle speed, a degree of battery swelling, a presence or an absence of gas in the battery, a battery over-charge, a battery over-discharge, or an internal short of battery.

9. The battery pack control method of claim 6, further comprising generating a control signal to alert a user of the vehicle when the stability condition requirement is not satisfied.

10. A battery pack comprising:
a battery for supplying power to a starter motor of a vehicle; and
a battery management unit for monitoring a condition of the battery and for communicating with an engine management unit for controlling starting of an Idle Stop & Go (ISG) mode of the vehicle, wherein the battery management unit is configured to:
transmit a control signal to the engine management unit based on the condition of the battery, the control signal being for preventing starting of the ISG mode or for terminating the ISG mode,
detect a response of the engine management unit to the control signal, and
block the supply of power from the battery to the starter motor of the vehicle when there is no response from the engine management unit after a period of time.

11. The battery pack of claim 10, wherein the condition of the battery corresponds to at least one of a battery temperature, a cooling water temperature, a degree of battery swelling, a presence or an absence of gas in the battery, a battery over-charge, a battery over-discharge, or an internal short of battery.

12. The battery pack of claim 10, further comprising a recovery process unit for restoring the battery to normal operating conditions when a stability condition requirement of the battery is not satisfied.

13. The battery pack of claim 10, wherein the battery management unit is further configured to generate a control signal for alerting a user of the vehicle.

14. A battery pack control method comprising:
monitoring a condition of a battery by a battery management unit;
generating a control signal when a stability condition requirement for the battery is not satisfied, to prevent starting of an Idle Stop & Go (ISG) mode or to terminate the ISG mode;
transmitting the control signal to an engine management unit;
detecting a response of the engine management unit to the control signal; and
blocking supply of power from the battery to a starter motor of a vehicle when the engine management unit does not respond within a period of time.

15. The battery pack control method of claim 14, wherein the stability condition requirement corresponds to at least one of a battery temperature, a cooling water temperature, a vehicle speed, a degree of battery swelling, a presence or absence of gas in the battery, a battery over-charge, a battery over-discharge, or an internal short of battery.

16. The battery pack control method of claim 14, further comprising restoring the battery to normal operating conditions when the stability condition requirement is not satisfied.

17. The battery pack control method of claim 14, further comprising generating a control signal to alert a user of the vehicle when the stability condition requirement is not satisfied.

18. A battery pack comprising:
a battery for supplying power to a starter motor of a vehicle; and
a battery management unit for monitoring a condition of the battery, and for generating a control signal when a stability condition requirement for the battery is not satisfied, the control signal being for preventing starting of an Idle Stop & Go (ISG) mode or for terminating the ISG mode, wherein the battery management unit is configured to detect the starting of the ISG mode or the terminating of the ISG mode in response to the control signal, and to block the supplying of power to the starter motor when the starting of the ISG mode or the terminating of the ISG mode is not detected after a period of time.

19. A battery pack control method comprising:
monitoring a condition of a battery by a battery management unit;
generating a control signal when a stability condition requirement for the battery is not satisfied, to prevent starting of an Idle Stop & Go (ISG) mode or to terminate the ISG mode;
transmitting the control signal to an engine management unit;
detecting the starting of the ISG mode or the terminating of the ISG mode in response to the control signal; and blocking supply of power from the battery when the starting of the ISG mode or the terminating of the ISG mode is not detected after a period of time.

* * * * *